US012588127B2

(12) United States Patent
Cai

(10) Patent No.: US 12,588,127 B2
(45) Date of Patent: Mar. 24, 2026

(54) SMART CHRISTMAS TREE WITH SELF-ADAPTIVE LIGHTING

(71) Applicants: Winner Industry Company Limited, Dongguan City (CN); Winners Group Industries Company Limited, Guangxi Zhuang Autonomous Reg. (CN)

(72) Inventor: Junhao Cai, Dongguan City (CN)

(73) Assignees: Winner Industry Company Limited, Dongguan (CN); Winners Group Industries Company Limited, Guangxi Zhuang Autonomous Reg. (CN)

(*) Notice: Subject to any disclaimer, the term of this patent is extended or adjusted under 35 U.S.C. 154(b) by 60 days.

(21) Appl. No.: 18/785,496

(22) Filed: Jul. 26, 2024

(65) Prior Publication Data

US 2025/0081315 A1 Mar. 6, 2025

(30) Foreign Application Priority Data

Sep. 4, 2023 (CN) ......................... 202311131506.1

(51) Int. Cl.

| | |
|---|---|
| ***F21S 4/10*** | (2016.01) |
| ***A47G 33/06*** | (2006.01) |
| ***A47G 33/12*** | (2006.01) |
| ***F21V 33/00*** | (2006.01) |
| ***H05B 47/10*** | (2020.01) |
| ***H05B 47/105*** | (2020.01) |

(Continued)

(52) U.S. Cl.

CPC ........... *H05B 47/165* (2020.01); *A47G 33/06* (2013.01); *A47G 33/126* (2013.01); *F21S 4/10* (2016.01); *F21V 33/0028* (2013.01); *H05B 47/105* (2020.01); *F21W 2121/04* (2013.01)

(58) Field of Classification Search

CPC ... F21S 4/00; F21S 4/10; F21S 43/246; H05B 47/10; H05B 47/105; H05B 47/165; A47G 33/06; A47G 33/12; A47G 33/126

See application file for complete search history.

(56) References Cited

U.S. PATENT DOCUMENTS

| | | | | |
|---|---|---|---|---|
| 9,593,831 | B2 * | 3/2017 | Yu | F21V 23/06 |
| 9,883,566 | B1 * | 1/2018 | Chen | H05B 45/10 |
| 10,028,360 | B1 * | 7/2018 | Chen | A47G 33/06 |

(Continued)

FOREIGN PATENT DOCUMENTS

| | | | |
|---|---|---|---|
| CN | 106907606 | A | 6/2017 |
| CN | 107435853 | A | 12/2017 |
| CN | 116195869 | A | 6/2023 |

*Primary Examiner* — Thai Pham

(74) *Attorney, Agent, or Firm* — Muncy, Geissler, Olds & Lowe, P.C.

(57) ABSTRACT

The present application discloses a smart Christmas tree with self-adaptive lighting, which includes a first trunk, a first separated branch, a second trunk, a second separated branch, a third trunk and a third separated branch. Wherein, when it is determined that a first angle between the first separated branch and the first trunk is within a first preset range, a first light string is controlled to light up. When it is determined that a second angle between the second separated branch and the second trunk is within a third preset range, a second light string is controlled to light up. When it is determined that a third angle between the third separated branch and the third trunk is within a fifth preset range, a third light string is controlled to light up.

10 Claims, 7 Drawing Sheets

(51) Int. Cl.
*H05B 47/165* (2020.01)
*F21W 121/04* (2006.01)

(56) References Cited

U.S. PATENT DOCUMENTS

| | | | | |
|---|---|---|---|---|
| 10,178,887 | B1* | 1/2019 | Chen | A41G 1/007 |
| 10,264,907 | B2* | 4/2019 | McRae | G02B 6/0006 |
| 10,288,236 | B1* | 5/2019 | Chen | F21S 4/26 |
| 2005/0180163 | A1* | 8/2005 | Huang | G02B 6/0008<br>362/568 |
| 2006/0164834 | A1* | 7/2006 | Kao | A47G 33/06<br>362/249.01 |
| 2012/0276307 | A1* | 11/2012 | Schooley | A47G 33/12<br>29/401.1 |
| 2016/0021957 | A1* | 1/2016 | Chen | F21V 23/001<br>362/123 |
| 2021/0007527 | A1* | 1/2021 | Loomis | F21S 4/10 |
| 2022/0052497 | A1* | 2/2022 | Ding | H01R 31/00 |
| 2022/0115815 | A1* | 4/2022 | Yu | H01R 13/02 |

* cited by examiner

SMART CHRISTMAS TREE WITH SELF-ADAPTIVE LIGHTING

CROSS-REFERENCE TO RELATED APPLICATION

This application claims priority to Chinese Patent Application No. CN202311131506.1 filed on Sep. 4, 2023, the entire content of which is hereby incorporated by reference.

FIELD OF TECHNOLOGY

The present application relates to the technical field of smart Christmas trees, and in particular to a smart Christmas tree with self-adaptive lighting.

BACKGROUND

A Christmas tree is an evergreen tree such as a fir tree or a pine decorated with lights. It is one of the most important elements of Christmas. The Christmas tree is usually brought into the house or displayed outdoors before Christmas and decorated with colored lights and ribbons hung on its branches.

Generally, light strings are hung on a Christmas tree, and the light strings are controlled to light up to further decorate the Christmas tree. A traditional Christmas tree has fixed trunk and branches. The light strings on the branches are controlled manually, which is inefficient and has low intelligence. With the advancement of lighting and intelligent control technologies, the traditional Christmas tree is unable to meet the high-quality demands of users.

SUMMARY

According to an aspect of this disclosure, a smart Christmas tree with self-adaptive lighting is disclosed.

The smart Christmas tree with self-adaptive lighting includes:

a first trunk, wherein a plurality of first branching devices are provided on an outer sidewall of the first trunk at intervals, a first controller electrically connected to a voltage source is provided in the first trunk;

a plurality of first separated branches rotatably provided on a first branching device of the plurality of first branching devices at intervals, wherein a first light string electrically connected to the first controller is provided in a first separated branch of the plurality of first separated branches;

a second trunk, wherein a bottom end of the second trunk is removably provided on a top end of the first trunk, a plurality of second branching devices are provided on an outer sidewall of the second trunk at intervals, a second controller electrically connected to the first controller when the second trunk is inserted on the first trunk is provided in the second trunk;

a plurality of second separated branches rotatably provided on a second branching device of the plurality of second branching devices at intervals, wherein a second light string electrically connected to the second controller is provided in a second separated branch of the plurality of second separated branches;

a third trunk, wherein a bottom end of the third trunk is removably provided on a top end of the second trunk, a plurality of third branching devices are provided on an outer sidewall of the third trunk at intervals, a third controller electrically connected to the third controller when the third trunk is inserted on the second trunk is provided in the third trunk;

a plurality of third separated branches rotatably provided on a third branching device of the plurality of third branching devices at intervals, wherein a third light string electrically connected to the third controller is provided in a third separated branch of the plurality of third separated branches;

wherein, when the first controller determines that a first angle between the first separated branch and the first trunk is within a first preset range, the first controller controls the first light string to light up, when the second controller determines an electrical connection to the first controller and a second angle between the second separated branch and the second trunk is within a third preset range, the second controller controls the second light string to light up, when the third controller determines an electrical connection to the second controller and a third angle between the third separated branch and the third trunk is within a fifth preset range, the third controller controls the third light string to light up.

BRIEF DESCRIPTION

DETAILED DESCRIPTION

Figure 1:
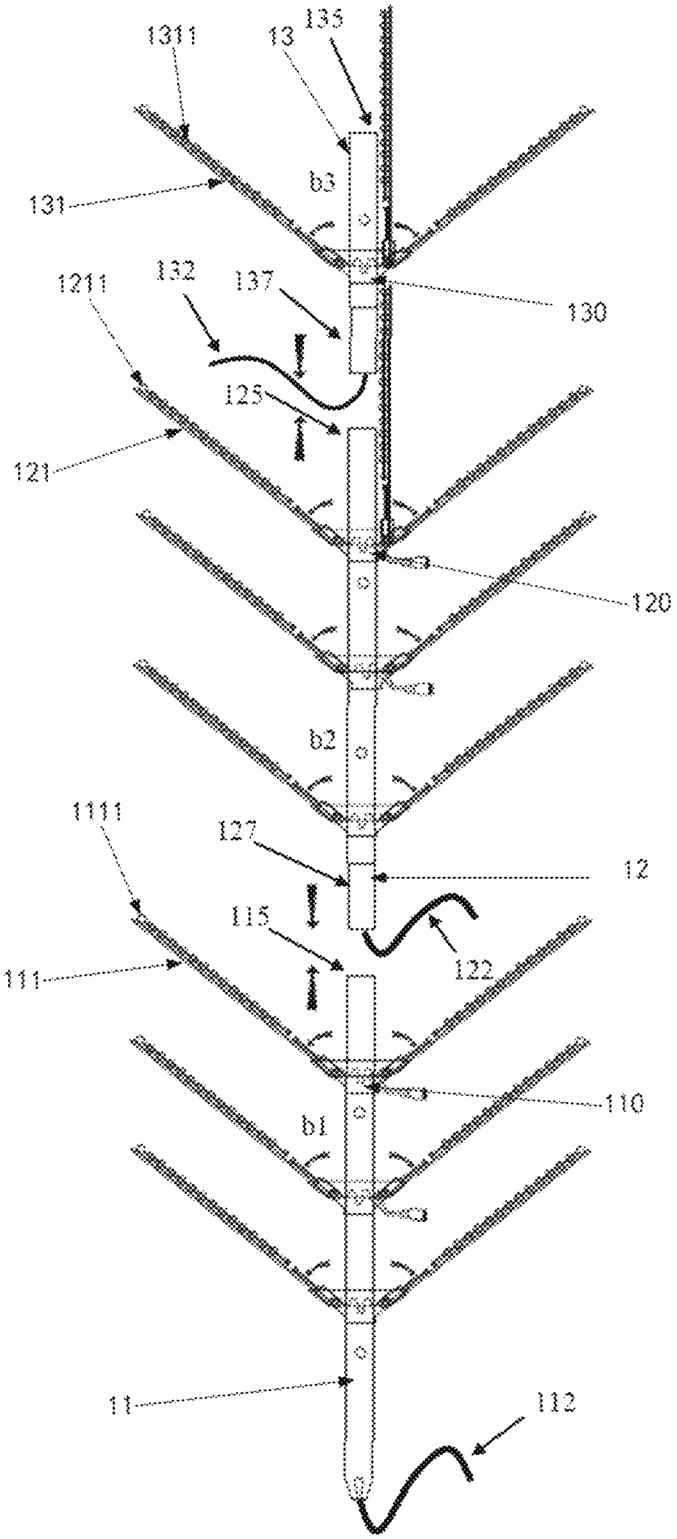
FIG. 1 is a schematic diagram of a smart Christmas tree with self-adaptive lighting of the present application.
Figure 2:
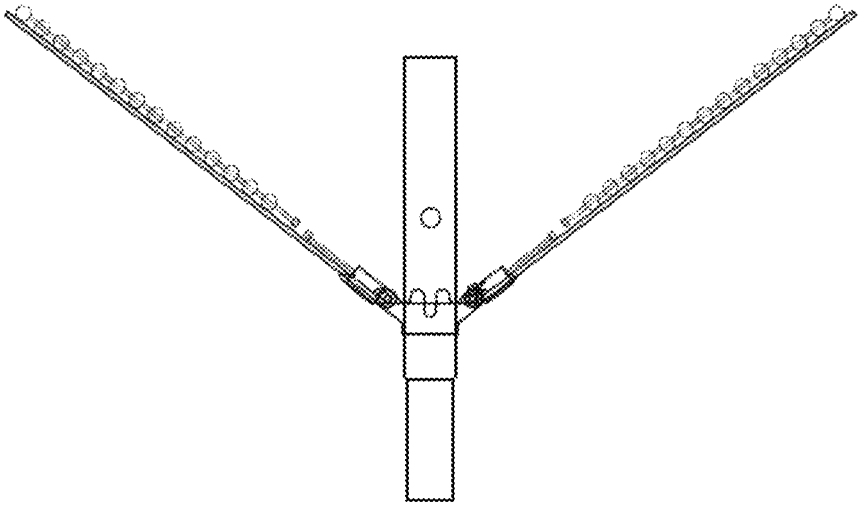
FIG. 2 is a schematic structural diagram of a third trunk and a third separated branch in FIG. 1 wherein a third angle between the third trunk and a third separated branch is in a fifth preset range.
Figure 3:
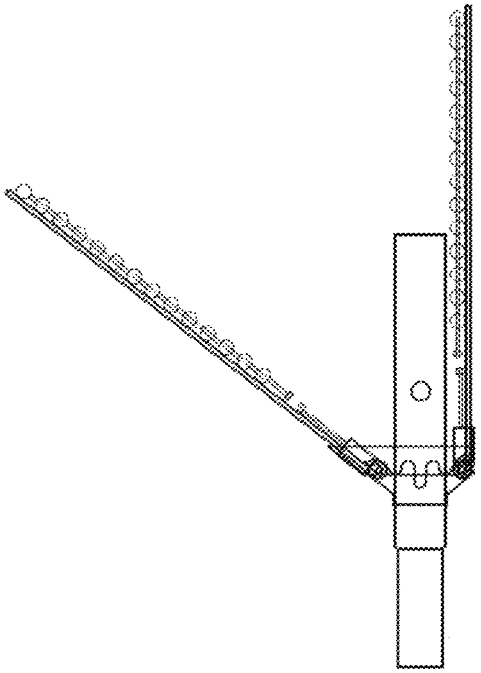
FIG. 3 is a schematic structural diagram of the third trunk and the third separated branch in FIG. 1 wherein the third angle between the third trunk and the third separated branch is in a sixth preset range.
Figure 4:
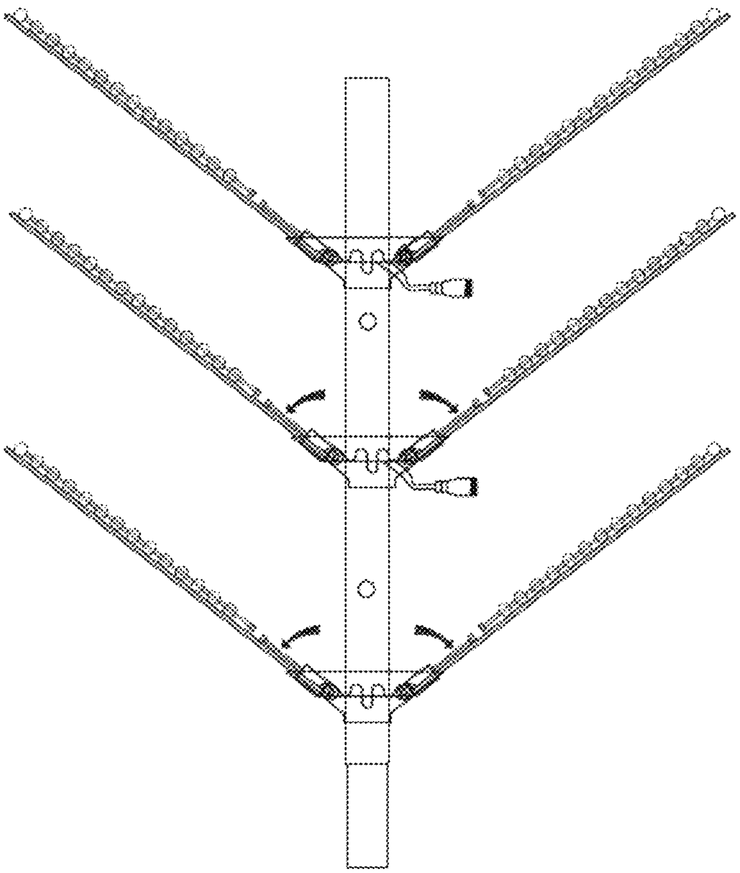
FIG. 4 is a schematic structural diagram of a second trunk and a second separated branch in FIG. 1, wherein a second angle between the second trunk and the second separated branch is in a third preset range.
Figure 5:
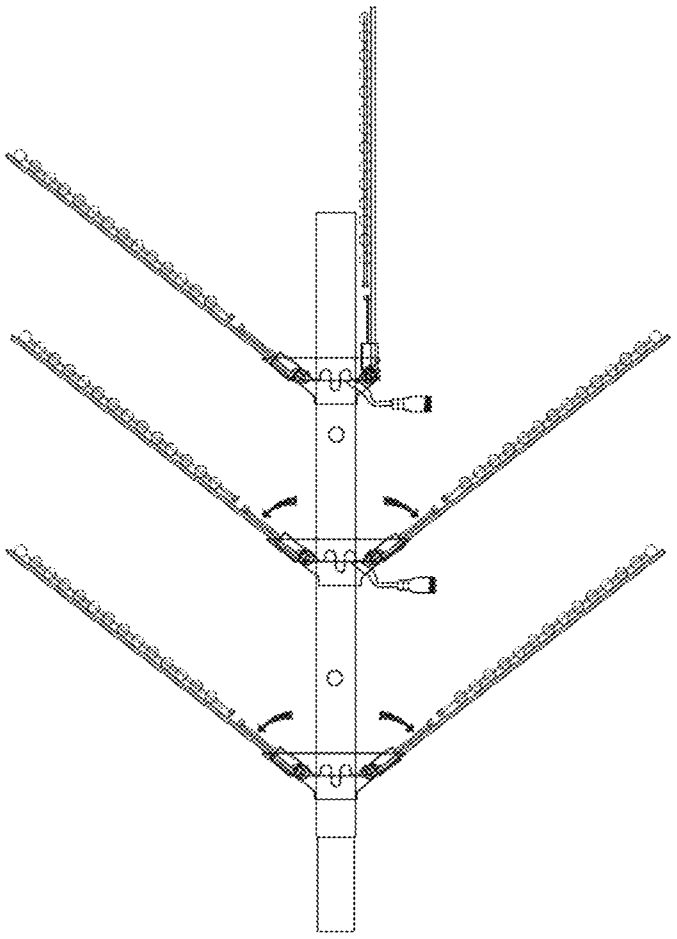
FIG. 5 is a schematic structural diagram of the second trunk and the second separated branch in FIG. 1, wherein the second angle between the second trunk and the second separated branch is in a fourth preset range.

In the following, embodiments of the present application are described with drawings clearly and completely. The embodiments described herein are only a few examples of the present application, and are not intended to be limiting. Based on the embodiments of the present application, all other embodiments obtained by a person skilled in the art without inventive work would fall into the scope of the present application.

Please refer to FIGS. 1-5. The present application discloses a smart Christmas tree with self-adaptive lighting, which includes a first trunk 11, a plurality of first separated branches 111, a second trunk 12, a plurality of second separated branches 121, a third trunk 13 and a plurality of third separated branches 131.

A plurality of first branching devices 110 are provided at intervals on an outer sidewall of the first trunk 11. In an embodiment, the first trunk 11 is in a cylindrical shape, the plurality of first branching devices 110 are sleeved on an outside of the first trunk 11. The plurality of first branching devices 110 are disposed along a length direction of the first trunk 11 on the outside of the first trunk 11 at intervals.

In an embodiment, a first controller 112 is provided. The first controller 112 is disposed inside the first trunk 11 and electrically connected to an external voltage source from inside to outside.

Figure 6:
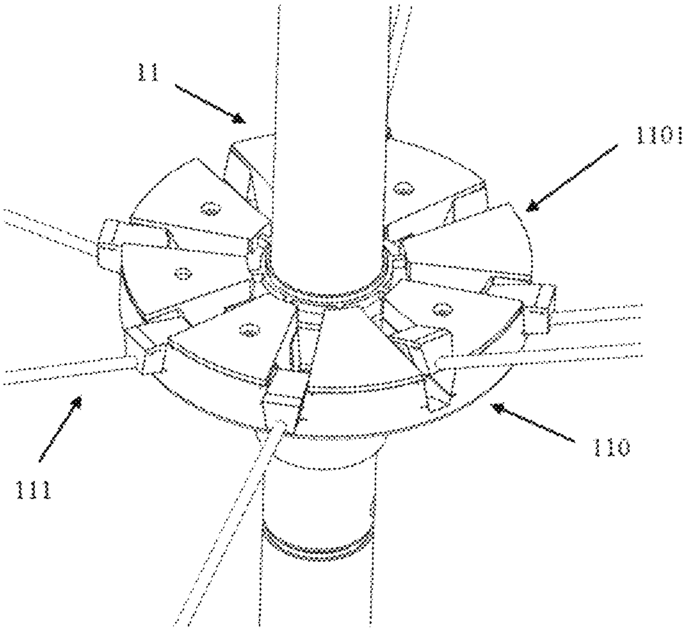
FIG. 6 is a schematic partial diagram of a first branching device of the present application.

The plurality of first separated branches 111 are rotatably provided on the first branching devices 110 at intervals. As shown in FIG. 6, in an embodiment, the plurality of first separated branches 111 are disposed around each of the plurality of first branching devices 110 at intervals along a circumferential direction of the first trunk 11. A bottom end of each of the plurality of first separated branches 111 is hinged with each of the plurality of first branching devices 110.

In an embodiment, a hinged shaft between the first separated branch 111 and the first branching device 110 is parallel to a radial direction of the first trunk 11, which enables the first separated branch 111 to rotate along a direction away or near the first trunk 11. It should be understood that since the first separated branch 111 is disposed rotatably, the first separated branch 111 may be rotated. The rotation may make the first separated branch 111 unfolded, that is, forms an angle larger than zero degree with the first trunk 11, and the first separated branch 111 may also be connected in parallel to the first trunk 11, forming an angle close to zero degree.

In this embodiment, a first light string 1111 electrically connected to the first controller 112 is provided in first separated branch 111, and a work of the first light string 1111 is controlled through the first controller 112.

Furthermore, the first branching device 110 is in a ring shape. A plurality of first accommodating slots 1101 are provided around an outside of the first branching device 110 at intervals. One end of the first separated branch 111 is inserted into the first accommodating slot 1101 removably. In this embodiment, the plurality of first accommodating slots 1101 are arranged along a circumferential direction of the first trunk 11, each of the plurality of first accommodating slots 1101 penetrates through the first branching device 110 from inside to outside along a radial direction of the first trunk 11.

In this embodiment, when the first controller 112 determines that a first angle b1 between the first separated branch 111 and the first trunk 11 is within a first preset range, the first controller 112 controls the first light string 1111 to light up. Furthermore, when the first controller 112 determines that the first angle b1 between the first separated branch 111 and the first trunk 11 is within a second preset range, the first controller 112 controls the first light string 1111 not to light up. Wherein, the second preset range is smaller than the first preset range.

It should be understood that the first preset range and the second preset range are artificially set ranges. For example, the first preset range is the first angle b1 between the first separated branch 111 and the first trunk 11 within 10-90 degrees, and the second preset range is the first angle b1 between the first separated branch 111 and the first trunk 11 within 0-10 degrees. When the first angle b1 between the first separated branch 111 and the first trunk 11 is within 0-10 degrees, the first separated branch 111 is in a stowed state relative to the first trunk 11, which does not belong to a display state and is not beautiful enough, so the first light string 1111 is controlled not to light up. When the first angle b1 between the first separated branch 111 and the first trunk 11 is within 10-90 degrees, the first separated branch 111 is in an unfolded state relative to the first trunk 11, which belongs to the display state, so the first light string 1111 is controlled to light up.

A bottom of the second trunk 12 is provided on a top end of the first trunk 11 along a length direction of the first trunk 11 removably.

In this embodiment, the second trunk 12 is in a cylindrical shape, the plurality of second branching devices 120 are sleeved on an outside of the second trunk 12 at intervals. In addition, the plurality of second branching devices 120 are disposed along a length direction of the second trunk 12 on the outside of the second trunk 12 at intervals.

Furthermore, a second controller 122 electrically connected to the first controller 121 when the second trunk 12 is inserted on the first trunk 11 is provided in the second trunk 12.

Figure 8:
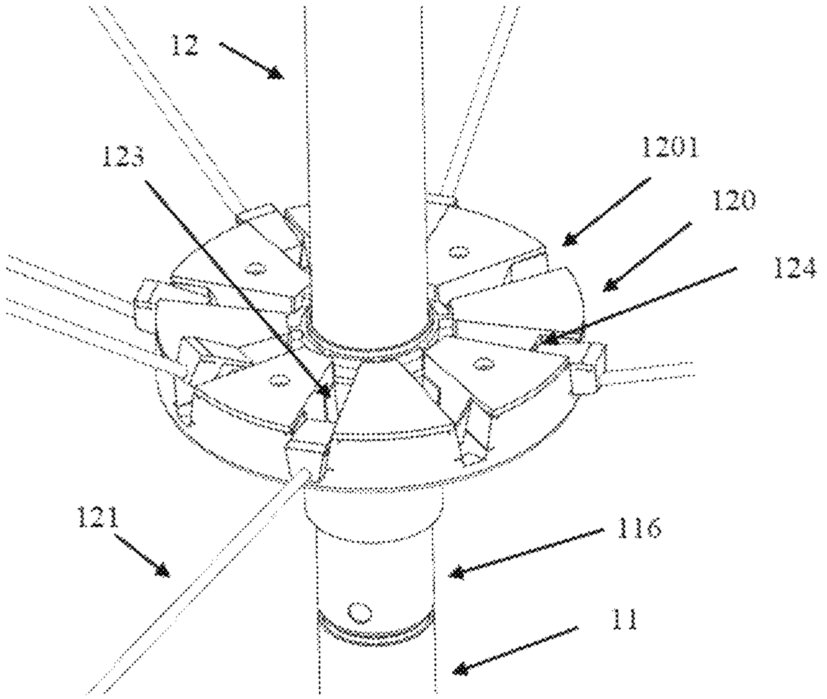
FIG. 8 is a schematic partial diagram of a second branching device of the present application.

The plurality of second separated branches 121 are rotatably provided on the second branching device 120 at intervals. As shown in FIG. 8, in this embodiment, the plurality of second separated branches 121 are arranged around the second branching device 120 at intervals along a circumferential direction of the second trunk 12, and a bottom end of the second separated branch 121 is hinged with the second branching device 120.

Furthermore, a hinged shaft between the second separated branch 121 and the second branching device 120 is parallel to a radial direction of the second trunk 12, which enables the second separated branch 121 to rotate along a direction away or near the second trunk 12. It should be understood that since the second separated branch 121 is disposed rotatably, the second separated branch 121 may be rotated. The rotation may make the second separated branch 121 unfolded, that is, forms an angle larger than zero degree with the second trunk 12, and the second separated branch 121 may also be connected in parallel to the second trunk 12, forming an angle close to zero degree.

In this embodiment, a second light string 1211 electrically connected to the second controller 122 is provided in the second separated branch 121, and an operation of the second light string 1211 is controlled through the second controller 122.

Furthermore, the second branching device 120 is in a ring shape. A plurality of second accommodating slots 1201 are provided around an outside of the second branching device 120 at intervals, and the second separated branch 121 is inserted into the second accommodating slot 1201 removably. In this embodiment, the plurality of second accommodating slots 1201 are arranged circumferentially along the second trunk 12, and each of the plurality of second accommodating slots 1201 penetrates through the second branching device 120 from inside to outside along a radial direction of the second trunk 12.

In this embodiment, when the second trunk 12 is inserted on the first trunk 11, and the second controller 122 determines an electrical connection to the first controller 112 and a second angle b2 between the second separated branch 121 and the second trunk 12 is within a third preset range, the second controller 122 controls the second light string 1211 to light up. Furthermore, when the second controller 122 determines that the second angle b2 between the second separated branch 121 and the second trunk 12 is within a fourth preset range, the second controller 122 controls the second light string 1211 not to light up. Wherein, the fourth preset range is smaller than the third preset range.

It should be understood that the fourth preset range and the third preset range are artificially set ranges. For example, the third preset range is the second angle b2 between the second separated branch 121 and the second trunk 12 within 10-90 degrees, and the fourth preset range is the second angle b2 between the second separated branch 121 and the second trunk 12 within 0-10 degrees. When the second angle b2 between the second separated branch 121 and the second trunk 12 is within 0-10 degrees, the second separated branch 121 is in a stowed state relative to the second trunk 12, which does not belong to a display state and is not beautiful enough, so the second light string 1211 is controlled not to light up. When the second angle b2 between the second separated branch 121 and the second trunk 12 is within 10-90 degrees, the second separated branch 121 is unfolded relative to the second trunk 12, which belongs to the display state, so the second light string 1211 is controlled to light up.

A bottom of the third trunk 13 is provided on a top end of the second trunk 12 along a length direction of the second trunk 12 removably.

In this embodiment, the plurality of third branching devices 130 are disposed on an outer sidewall of the third trunk 13 at intervals. Furthermore, the third trunk 13 is in a cylindrical shape, the plurality of third branching devices 130 are disposed along a length direction of the third trunk 13 on an outside of the third trunk 13 at intervals.

Furthermore, a third controller 132 electrically connected to the second controller 122 when the third trunk 13 is inserted on the second trunk 12 is provided in the third trunk 13.

Figure 10:
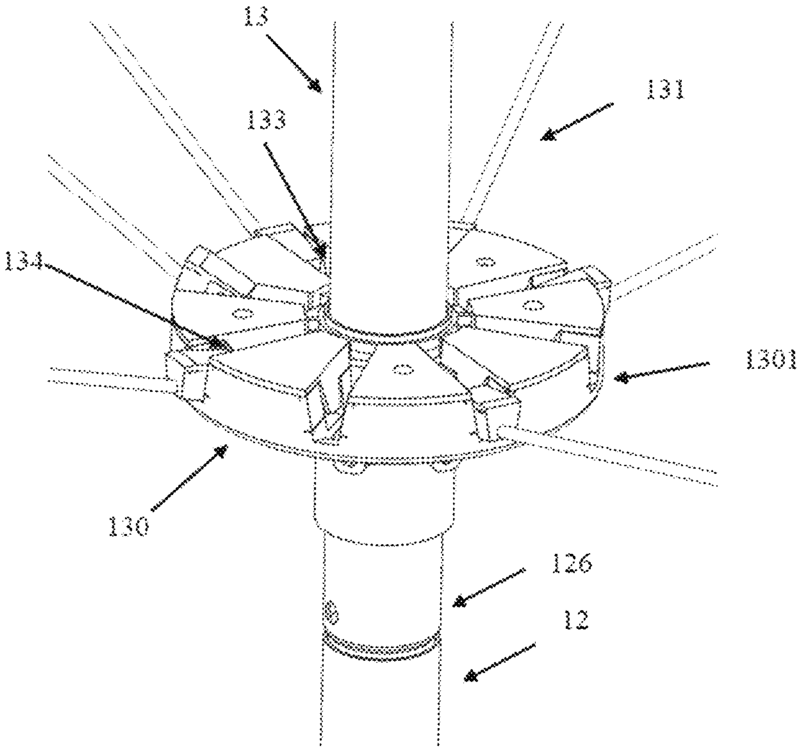
FIG. 10 is a schematic partial diagram of a third branching device of the present application.

The plurality of third separated branches 131 are rotatably provided on the third branching device 130 at intervals. In this embodiment, as shown in FIG. 10, the plurality of third separated branches 131 are arranged around each of the plurality of third branching devices 130 at intervals along a circumferential direction of the third trunk 13, and a bottom end of the third separated branch 131 is hinged with the third branching device 130.

Furthermore, a hinged shaft between the third separated branch 131 and the third branching device 130 is parallel to a radial direction of the third trunk 13, which enables the third separated branch 131 to rotate along a direction away or near the third trunk 13. It should be understood that since the third separated branch 131 is disposed rotatably, the third separated branch 131 may be rotated. The rotation may make the third separated branch 131 unfolded, that is, forms an angle larger than zero degree with the third trunk 13, and the third separated branch 131 may also be connected in parallel to the third trunk 13, forming an angle close to zero degree.

In this embodiment, a third light string 1311 electrically connected to the third controller 132 is provided in the third separated branch 131, and an operation of the third light string 1311 is controlled through the third controller 132.

Furthermore, the third branching device 130 is in a ring shape. A plurality of third accommodating slots 1301 are provided around an outside of the third branching device 130 at intervals, and the third separated branch 131 is inserted into the third accommodating slot 1301 removably. In this embodiment, the plurality of third accommodating slots 1301 are arranged along a circumferential direction of the third trunk 13, each of the plurality of third accommodating slots 1301 penetrates through the third branching device 130 from inside to outside along a radial direction of the third trunk 13. In this embodiment, when the third controller 132 determines an electrical connection to the second controller 122 and a third angle b3 between the third separated branch 131 and the third trunk 13 is within a fifth preset range, the third controller 132 controls the third light string 1311 to light up. Furthermore, when the third controller 132 determines that the third angle b3 between the third separated branch 131 and the third trunk 13 is within a sixth preset range, the third controller 132 controls the third light string 1311 not to light up. Wherein, the sixth preset range is smaller than the fifth preset range.

It should be noted that in this embodiment, a length of the first separated branch 111 is longer than a length of the second separated branch 121, and the length of the second separated branch 121 is longer than a length of the third separated branch 131, so that the Christmas tree looks more beautiful when it is in an unfolded state. Furthermore, a maximum value of the first preset range is larger than a maximum value of the third preset range, and the maximum value of the third preset range is larger than a maximum value of the fifth preset range. In this way, when the Christmas tree is in an unfolded state, a maximum value of the second angle b2 between the second separated branch 121 and the second trunk 12 is smaller than a maximum value of the first angle b1 between the first separated branch 111 and the first trunk 11, and a maximum value of the third angle b3 between the third separated branch 131 and the third trunk 13 is smaller than the maximum value of the second angle b2 between the second separated branch 121 and the second trunk 12, so that the Christmas tree looks most beautiful when it is in an unfolded state.

In this embodiment, when it is determined that the second trunk 12 is inserted on the first trunk 11 and the third trunk 13 is inserted on the second trunk 12, if it is detected that the first angle b1 between the first separated branch 111 and the first trunk 11 is smaller than the second angle b2 between the second separated branch 121 and the second trunk 12, the second controller 122 controls the second light string 1211 not to light up; and if it is detected that the second angle b2 between the second separated branch 121 and the second trunk 12 is smaller than the third angle b3 between the third separated branch 131 and the third trunk 13, the third controller 132 controls the third light string 1311 not to light up. In this way, the Christmas tree is allowed to light up in a most beautiful state. Alternatively, a side wall of the first accommodating slot 1101 opposite to the first separated branch 111 is provided with a connector tab, and a connector of the first light string 1111 is provided on an end of the first separated branch 111. When the first separated branch 111 is located in the first accommodating slot 1101, the connector tab is connected to the connector of the first light string 1111, the first light string 1111 lights up. When the first separated branch 111 is rotated away from the first accommodating slot 1101, the first light string 1111 does not light up. Similarly, when the second separated branch 121 is rotated away from the second accommodating slot 1201, the second light string 1211 does not light up, and when the third separated branch 131 is rotated away from the third accommodating slot 1301, the third light string 1311 does not light up.

Figure 7:
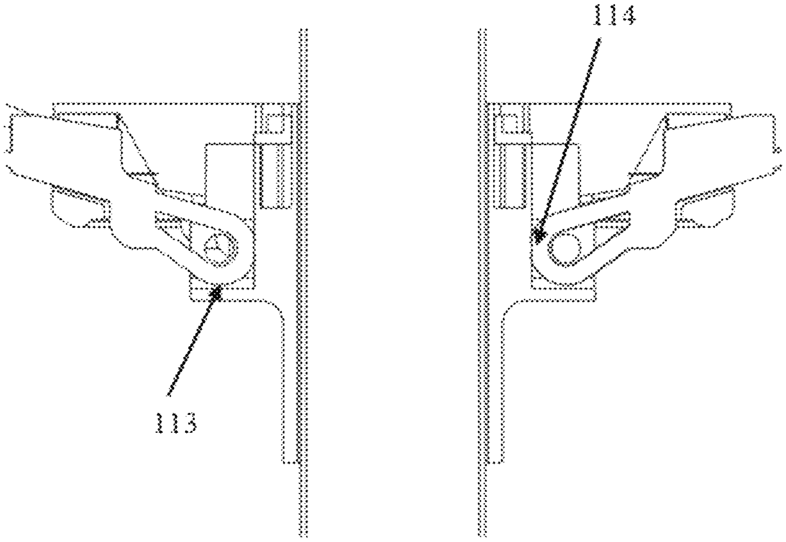
FIG. 7 is a schematic partial sectional diagram of the first branching device of the present application.
Figure 9:
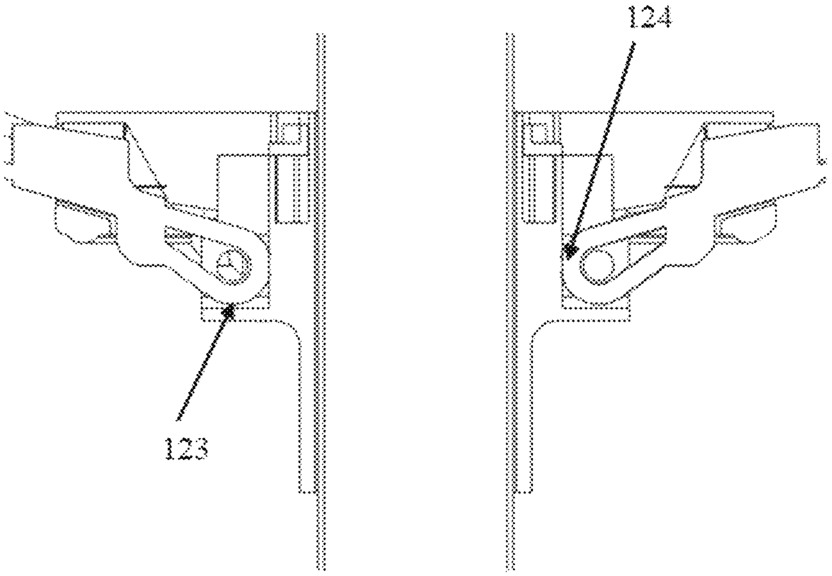
FIG. 9 is a schematic partial sectional diagram of the second branching device of the present application.
Figure 11:
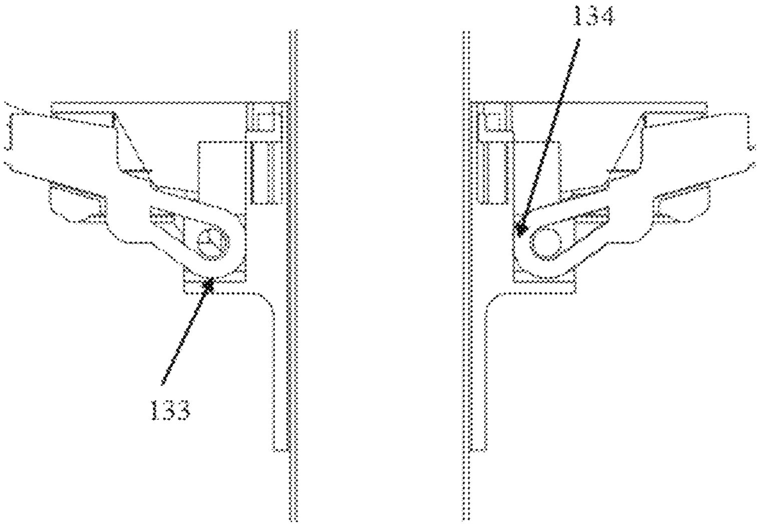
FIG. 11 is a schematic partial sectional diagram of the third branching device of the present application.

Furthermore, in some embodiments, as shown in FIG. 7, a first vertical pressure sensor 113 is provided in the first accommodating slot 1101 of the first branching device 110, and the first vertical pressure sensor 113 is electrically connected to the first controller 112 and is used to detect a first pressure value exerted by the first separated branch 111 on a bottom wall of the first accommodating slot 1101 along the vertical direction. As shown in FIG. 9, a second vertical pressure sensor 123 is provided in the second accommodating slot 1201 of the second branching device 120, and the second vertical pressure sensor 123 is electrically connected to the second controller 122 and is used to detect a second pressure value exerted by the second separated branch 121 on a bottom wall of the second accommodating slot 1201 along the vertical direction. As shown FIG. 11, a third vertical pressure sensor 133 is provided in the third accommodating slot 1301 of the third branching device 130, and the third vertical pressure sensor 133 is electrically connected to the third controller 132 and is used to detect a third pressure value exerted by the third separated branch 131 on a bottom wall of the third accommodating slot 1301 along the vertical direction.

Furthermore, when it is determined that the first separated branch 111 is inserted in the first branching device 110, the first controller 112 controls the first vertical pressure sensor 113 to be activated to detect the first pressure value exerted by the first separated branch 111 on the first accommodating slot 1101 along the vertical direction, and calculates the first angle b1 between the first separated branch 111 and the first trunk 11 according to a total weight of the first separated branch 111. Then the first controller 112 determines whether the first angle b1 is within the first preset range or the second preset range, and controls on or off of the first light string 1111 accordingly. That is to say, when it is determined that the first angle b1 is within the first preset range, the first light string 1111 is controlled to light up; when it is determined that the first angle b1 is within the second preset range, the first light string 1111 is controlled not to light up.

It should be understood that the total weight of each of the plurality of the first separated branches 111 is known and may be obtained by the first controller 112.

Furthermore, when it is determined that the second trunk 12 is inserted on the first trunk 11 and the second separated branch 121 is inserted in the second branching device 120, the second controller 122 controls the second vertical pressure sensor 123 to be activated to detect the second pressure value exerted by the second separated branch 121 on the second accommodating slot 1201 along the vertical direction, and calculates the second angle b2 between the second separated branch 121 and the second trunk 12 according to a total weight of the second separated branch 121. Then the second controller 122 determines whether the second angle b2 is within the third preset range or the fourth preset range, and controls on or off of the second light string 1211 accordingly. That is to say, when it is determined that the second angle b2 is within the third preset range, the second light string 1211 is controlled to light up; when it is determined that the second angle b2 is within the fourth preset range, the second light string 1211 is controlled not to light up.

It should be understood that the total weight of each of the plurality of the second separated branches 121 is known and may be obtained by the second controller 122.

Furthermore, when it is determined that the third trunk 13 is inserted on the second trunk 12 and the third separated branch 131 is inserted in the third branching device 130, the third controller 113 controls the third vertical pressure sensor 133 to be activated to detect the third pressure value exerted by the third separated branch 131 on the third accommodating slot 1301 along the vertical direction, and calculates the third angle b3 between the third separated branch 131 and the third trunk 13 according to a total weight of the third separated branch 131. Then the third controller 132 determines whether the third angle b3 is within the fifth preset range or the sixth preset range, and controls on or off of the third light string 1311 accordingly. That is to say, when it is determined that the third angle b3 is within the fifth preset range, the third light string 1311 is controlled to light up; when it is determined that the third angle b3 is within the sixth preset range, the third light string 1311 is controlled not to light up.

It should be understood that the total weight of each of the plurality of the third separated branches 131 is known and may be obtained by the third controller 132.

In this embodiment, when the first angle b1 is within the first preset range, brightness of the first light string 1111 increases as the first angle b1 increases. When the second angle b2 is within the third preset range, brightness of the second light string 1211 increases as the second angle b2 increases. When the third angle b3 is within the fifth preset range, brightness of the third light string 1311 increases as the third angle b3 increases.

Furthermore, in other embodiments, the length of each of the plurality of first separated branches 111 is different, and the total weight of each of the plurality of first separated branches 111 is different. A bottom end of each of the plurality of first separated branches 111 is provided with a first ID code correspondingly, and each first ID code corresponds to one total weight. A first recognizer 114 used to recognize the first ID code is provided in each of the plurality of first accommodating slots 1101 of the first branching device 110, that is, when the first separated branch 111 is inserted in the first accommodating slot 1101, the first recognizer 114 may recognize the first ID code corresponding to the first separated branch 111. The length of each of the plurality of second separated branches 121 is different, and the total weight of each of the plurality of second separated branches 121 is different. A bottom end of each of the plurality of second separated branches 121 is provided with a second ID code correspondingly, and each second ID code corresponds to one total weight. A second recognizer 124 used to recognize the second ID code is provided in each of the plurality of second accommodating slots 1201 of the second branching device 120, that is, when the second separated branch 121 is inserted in the second accommodating slot 1201, the second recognizer 124 may recognize the second ID code corresponding to the second separated branch 121. The length of each of the plurality of third separated branch 131 is different, and the total weight of each of the plurality of third separated branch 131 is different. A bottom end of each of the plurality of third separated branches 131 is provided with a third ID code correspondingly, and each third ID code corresponds to one total weight. A third recognizer 134 used to recognize the third ID code is provided in each of the plurality of third accommodating slots 1301 of the third branching devices 130, that is, when the third separated branch 131 is inserted in the third accommodating slot 1301, the third recognizer 134 may recognize the third ID code corresponding to the third separated branch 131.

Furthermore, according to principles of mechanics, when it is determined that the first separated branch 111 is inserted in the first accommodating slot 1101 of the first branching device 110, the first recognizer 114 recognizes the first ID code of the first separated branch 111, and the first controller 112 decodes the first ID code to obtain the total weight corresponding to the first ID code, that is, the first controller 112 decodes the first ID code to obtain the total weight of the first separated branch 111 inserted in the first accommodating slot 1101, which is convenient for the first controller 112 to calculate the first angle b1 between the first separated branch 111 and the first trunk 11 according to the total weight and the first pressure value of the first separated branch 111.

Furthermore, when it is determined that the second separated branch 121 is inserted in the second accommodating slot 1201 of the second branching device 120, the second recognizer 124 recognizes the second ID code of the second separated branch 121, and the second controller 122 decodes the second ID code to obtain the total weight corresponding to the second ID code, that is, the second controller 122 decodes the second ID code to obtain the total weight of the second separated branch 121 inserted in the second accommodating slot 1201, which is convenient for the second controller 122 to calculate the second angle b2 between the second separated branch 121 and the second trunk 12 according to the total weight and the second pressure value of the second separated branch 121.

Furthermore, when it is determined that the third separated branch 131 is inserted in the third accommodating slot 1301 of the third branching device 130, the third recognizer 134 recognizes the third ID code of the third separated branch 131, and the third controller 132 decodes the third ID code to obtain the total weight corresponding to the third ID code, that is, the third controller 132 decodes the third ID code to obtain the total weight of the third separated branch 131 inserted in the third accommodating slot 1301, which is convenient for the third controller 132 to calculate the third angle b3 between the third separated branch 131 and the third trunk 13 according to the total weight and the third pressure value of the third separated branch 131.

Furthermore, in other embodiments, a first accommodating cavity 115 is provided on the top of the first trunk 11. A first motor 116 electrically connected to the first controller 112 is provided in the first accommodating cavity 115. The bottom end of the second trunk 12 is used to be inserted into the first accommodating cavity 115. A first clamping hole 127 whose cross-section is in a polygonal shape, such as a quadrilateral, a pentagon, etc. is provided in the bottom end of the second trunk 12 to hold and clamp an output shaft of the first motor 116. A second accommodating cavity 125 is provided on the top of the second trunk 12. A second motor 126 electrically connected to the second controller 122 is provided in the second accommodating cavity 125. The bottom end of the third trunk 13 is used to be inserted into the second accommodating cavity 125. A second clamping hole 137 whose cross-section is in a polygonal shape is provided in the bottom end of the third trunk 13 to hold and clamp an output shaft of the second motor 126. It should be understood that the output shaft of the first motor 116 is also in a polygonal shape and corresponds to the first clamping hole 127, so that the output shaft of the first motor 116 may be clamped in the first clamping hole 127. The output shaft of the second motor 126 is also in a polygonal shape and corresponds to the second clamping hole 137, so that the output shaft of the second motor 126 may be clamped in the second clamping hole 137.

Furthermore, when it is determined that the second trunk 12 is inserted on the first trunk 11 and the second light string 1211 of the second separated branch 121 inserted in the second accommodating slot 1201 is lit up, the first controller 112 controls the first motor 116 to work, so that the first motor 116 drives the second trunk 12 to rotate.

Furthermore, when it is determined that the third trunk 13 is inserted on the second trunk 12 and the third light string 1311 of the third separated branch 131 inserted in the third accommodating slot 1301 is lit up, the second controller 122 controls the second motor 126 to work, so that the second motor 126 drives the third trunk 13 to rotate.

It should be noted that the control of rotating the second trunk 12 and the third trunk 13 also requires careful consideration. Particularly, when it is determined that the first motor 116 and the second motor 126 are working simultaneously, a direction of the rotation of the second trunk 12 driven by the first motor 116 controlled by the first controller 112 is as same as a direction of the rotation of the third trunk 13 driven by the second motor 126 controlled by the second controller 122. Moreover, a speed of the rotation of the second trunk 12 driven by the first motor 116 controlled by the first controller 112 is different with a speed of the rotation of the third trunk 13 driven by the second motor 126 controlled by the second controller 122. In this way, the Christmas tree looks more beautiful with a difference of the speed of the rotation.

Or, in other cases, when it is determined that the first motor 116 and the second motor 126 are working simultaneously, the direction of the rotation of the second trunk 12 driven by the first motor 116 controlled by the first controller 112 is opposite to the direction of the rotation of the third trunk 13 driven by the second motor 126 controlled by the second controller 122. And the speed of the rotation of the second trunk 12 driven by the first motor 116 controlled by the first controller 112 is as same as the speed of the rotation of the third trunk 13 driven by the second motor 126 controlled by the second controller 122.

In some embodiment, the first accommodating cavity 115 is disposed along the length direction of the first trunk 11 for accommodating the plurality of first separated branches 111. The second accommodating cavity 125 is disposed along the length direction of the second trunk 12 for accommodating the plurality of second separated branches 121. The third accommodating cavity 135 is disposed along the length direction of the third trunk 13 for accommodating the plurality of third separated branches 131.

Furthermore, in some embodiment, a lifting table is provided at a bottom of the first trunk 11 for driving the first trunk 11 up and down. When it is determined that the first controller 112 controls the first motor 116 to drive the second trunk 12 to rotate and the second controller 122 controls the second motor 126 to drive the third trunk 13 to rotate, at the same time the lifting table drives the first trunk 11 to rise at a constant speed and to descend at a constant speed after reaching a preset position.

It should be noted that terms “comprise”, “include” or any other variation thereof are intended to cover non-exclusive inclusions, so that a process, method, article or apparatus that includes a series of elements includes not only those elements, but also other elements not expressly listed, or elements inherent in such process, method, article or apparatus. In an absence of further limitations, elements defined by the statement “including a . . . ” do not preclude the existence of other identical elements in the process, method, article or apparatus.

Although embodiments are shown and described, variations, modifications, substitutions and variants of these embodiments may be made by a person skilled in the art without deviating from the principle and spirit of the present application. The scope of the present application is limited by the attached claims and their equivalents.

What is claimed:

1. A smart Christmas tree with self-adaptive lighting, comprising:

a first trunk, wherein a plurality of first branching devices are provided on an outer sidewall of the first trunk at intervals, a first controller electrically connected to a voltage source is provided in the first trunk;

a plurality of first separated branches rotatably provided on a first branching device of the plurality of first branching devices at intervals, wherein a first light string electrically connected to the first controller is provided in a first separated branch of the plurality of first separated branches;

a second trunk, wherein a bottom end of the second trunk is removably provided on a top end of the first trunk, a plurality of second branching devices are provided on an outer sidewall of the second trunk at intervals, a second controller electrically connected to the first controller when the second trunk is inserted on the first trunk is provided in the second trunk;

a plurality of second separated branches rotatably provided on a second branching device of the plurality of second branching devices at intervals, wherein a second light string electrically connected to the second controller is provided in a second separated branch of the plurality of second separated branches;

a third trunk, wherein a bottom end of the third trunk is removably provided on a top end of the second trunk, a plurality of third branching devices are provided on an outer sidewall of the third trunk at intervals, a third controller electrically connected to the third controller when the third trunk is inserted on the second trunk is provided in the third trunk;

a plurality of third separated branches rotatably provided on a third branching device of the plurality of third branching devices at intervals, wherein a third light string electrically connected to the third controller is provided in a third separated branch of the plurality of third separated branches;

wherein, when the first controller determines that a first angle between the first separated branch and the first trunk is within a first preset range, the first controller controls the first light string to light up, when the second controller determines an electrical connection to the first controller and a second angle between the second separated branch and the second trunk is within a third preset range, the second controller controls the second light string to light up, when the third controller determines an electrical connection to the second controller and a third angle between the third separated branch and the third trunk is within a fifth preset range, the third controller controls the third light string to light up.

2. The smart Christmas tree with self-adaptive lighting of claim 1, wherein, the plurality of first branching devices are provided on an outer side of the first trunk along a length direction of the first trunk at intervals, the first branching device is in a ring shape, and a plurality of first accommodating slots are provided around an outer side of the first branching device at intervals, and the first separated branch is removably disposed in a first accommodating slot of the plurality of first accommodating slots.

3. The smart Christmas tree with self-adaptive lighting of claim 2, wherein, the plurality of second branching devices are provided around an outer side of the second trunk along a length direction of the second trunk at intervals, the second branching device is in a ring shape, and a plurality of second accommodating slots are provided around an outer side of the second branching device at intervals, and the second separated branch is removably disposed in a second accommodating slot of the plurality of second accommodating slots.

4. The smart Christmas tree with self-adaptive lighting of claim 3, wherein, the plurality of third branching devices are provided around an outer side of the third trunk along a length direction of the third trunk at intervals, the third branching device is in a ring shape, a plurality of third accommodating slots are provided around an outer side of the third branching device at intervals, and the third separated branch is removably disposed in a third accommodating slot of the plurality of third accommodating slots.

5. The smart Christmas tree with self-adaptive lighting of claim 4, wherein, when the first controller determines that the first angle between the first separated branch and the first trunk is within the second preset range, the first controller controls the first light string not to light up, wherein the second preset range is smaller than the first preset range; when the second controller determines that the second angle between the second separated branch and the second trunk is within the fourth preset range, the second controller controls the second light string not to light up, wherein the fourth preset range is smaller than the third preset range; when the third controller determines that the third angle between the third separated branch and the third trunk is within the sixth preset range, the third controller controls the third light string not to light up, wherein the sixth preset range is smaller than the fifth preset range.

6. The smart Christmas tree with self-adaptive lighting of claim 5, wherein, a length of the first separated branch is longer than a length of the second separated branch, and the length of the second separated branch is longer than a length of the third separated branch, a maximum value of the first preset range is larger than a maximum value of the third preset range, and the maximum value of the third preset range is larger than a maximum value of the fifth preset range;

wherein, when it is determined that the second trunk is inserted on the first trunk and the third trunk is inserted on the second trunk, if it is detected that the first angle between the first separated branch and the first trunk is smaller than the second angle between the second separated branch and the second trunk, the second controller controls the second light string not to light up; and if it is detected that the second angle between the second separated branch and the second trunk is smaller than the third angle between the third separated branch and the third trunk, the third controller controls the third light string not to light up.

7. The smart Christmas tree with self-adaptive lighting of claim 5, wherein, a first vertical pressure sensor electrically connected to the first controller is provided in the first accommodating slot of the first branching device, the first vertical pressure sensor is used to detect a first pressure value exerted by the first separated branch on a bottom wall of the first accommodating slot along the vertical direction, when it is determined that the first separated branch is inserted in the first branching device, the first controller controls the first vertical pressure sensor to be activated to detect the first pressure value exerted by the first separated branch to the first accommodating slot along the vertical direction, calculates the first angle between the first separated branch and the first trunk according to a total weight of the first separated branch to determine whether the first angle is within the first preset range or the second preset range, and controls on or off of the first light string accordingly;

a second vertical pressure sensor electrically connected to the second controller is provided in the second accommodating slot of the second branching device, the second vertical pressure sensor is used to detect a second pressure value exerted by the second separated branch on a bottom wall of the second accommodating slot along the vertical direction, when it is determined that the second trunk is inserted on the first trunk and the second separated branch is inserted in the second branching device, the second controller controls the second vertical pressure sensor to be activated to detect the second pressure value exerted by the second separated branch on the second accommodating slot along the vertical direction, calculates the second angle between the second separated branch and the second trunk according to a total weight of the second separated branch to determine whether the second angle is within the third preset range or the fourth preset range, and controls on or off of the second light string accordingly;

a third vertical pressure sensor electrically connected to the third controller is provided in the third accommodating slot of the third branching device, the third vertical pressure sensor is used to detect a third pressure value exerted by the third separated branch on a bottom wall of the third accommodating slot along the vertical direction, when it is determined that the third trunk is inserted on the second trunk and the third separated branch is inserted in the third branching device, the third controller controls the third vertical pressure sensor to be activated to detect the third pressure value exerted by the third separated branch on the third accommodating slot along the vertical direction, calculates the third angle between the third separated branch and the third trunk according to a total weight of the third separated branch to determine whether the third angle is within the fifth preset range or the sixth preset range, and controls on or off of the third light string accordingly.

8. The smart Christmas tree with self-adaptive lighting of claim 7, wherein, when the first angle is within the first preset range, a brightness of the first light string increases as the first angle increases; when the second angle is within the third preset range, a brightness of the second light string increases as the second angle increases; and when the third angle is within the fifth preset range, a brightness of the third light string increases as the third angle increases.

9. The smart Christmas tree with self-adaptive lighting of claim 7, wherein, the length of each of the plurality of first separated branches is different, and the total weight of each of the plurality of first separated branches is different; a bottom end of each of the plurality of first separated branches is provided with a first ID code correspondingly, and each first ID code corresponds to one total weight; a first recognizer for recognizing the first ID code is provided in the first accommodating slot of the first branching device, when it is determined that the first separated branch is inserted in the first accommodating slot of the first branching device, the first recognizer recognizes the first ID code of the first separated branch, and the first controller decodes the first ID code to obtain the total weight corresponding to the first ID code;

the length of each of the plurality of second separated branches is different, and the total weight of each of the plurality of second separated branches is different; a bottom end of each of the plurality of second separated branches is provided with a second ID code correspondingly, and each second ID code corresponds to one total weight; a second recognizer for recognizing the second ID code is provided in the second accommodating slot of the second branching device, when it is determined that the second separated branch is inserted in the second accommodating slot of the second branching device, the second recognizer recognizes the second ID code of the second separated branch, and the second controller decodes the second ID code to obtain the total weight corresponding to the second ID code; and the length of each of the plurality of third separated branches is different, and the total weight of each of the plurality of third separated branches is different; a bottom end of each of the plurality of third separated branches is provided with a third ID code correspondingly, and each third ID code corresponds to one total weight; a third recognizer for recognizing the third ID code is provided in the third accommodating slot of the third branching device, when it is determined that the third separated branch is inserted in the third accommodating slot of the third branching device, the third recognizer recognizes the third ID code of the third separated branch, and the third controller decodes the third ID code to obtain the total weight corresponding to the third ID code.

10. The smart Christmas tree with self-adaptive lighting of claim 9, wherein, a first accommodating cavity is provided on the top of the first trunk, a first motor electrically connected to the first controller is provided in the first accommodating cavity, the bottom of the second trunk is used to be inserted into the first accommodating cavity, a first clamping hole in a polygonal shape is provided in the bottom of the second trunk to hold and clamp an output shaft of the first motor; wherein, when it is determined that the second trunk is inserted on the first trunk and the second light string of the second separated branch inserted in the second accommodating slot is light up, the first controller controls the first motor to work, so that the first motor drives the second trunk to rotate;

a second accommodating cavity is provided on the top of the second trunk, a second motor electrically connected to the second controller is provided in the second accommodating cavity, the bottom of the third trunk is used to be inserted into the second accommodating cavity, a second clamping hole in a polygonal shape is provided in the bottom of the third trunk to hold and clamp an output shaft of the second motor; wherein, when it is determined that the third trunk is inserted on the second trunk and the third light string of the third separated branch inserted in the third accommodating slot is light up, the second controller controls the second motor to work, so that the second motor drives the third trunk to rotate;

wherein, when it is determined that the first motor and the second motor are working simultaneously, a direction of the rotation of the second trunk driven by the first motor controlled by the first controller is as the same as a direction of the rotation of the third trunk driven by the second motor controlled by the second controller, and a speed of the rotation of the second trunk driven by the first motor controlled by the first controller is different with a speed of the rotation of the third trunk driven by the second motor controlled by the second controller;

or, when it is determined that the first motor and the second motor are working simultaneously, the direction of the rotation of the second trunk driven by the first motor controlled by the first controller is opposite to the direction of the rotation of the third trunk driven by the second motor controlled by the second controller, and the speed of the rotation of the second trunk driven by the first motor controlled by the first controller is as the same as the speed of the rotation of the third trunk driven by the second motor controlled by the second controller.

* * * * *